(12) United States Patent
Toyama et al.

(10) Patent No.: US 9,640,221 B2
(45) Date of Patent: May 2, 2017

(54) INFORMATION OUTPUT DEVICE AND COMPUTER READABLE MEDIUM

(71) Applicant: CASIO COMPUTER CO., LTD., Shibuya-ku, Tokyo (JP)

(72) Inventors: Chihiro Toyama, Hachioji (JP); Toshihiko Yoshida, Fussa (JP); Kazuto Yamamoto, Akishima (JP); Kazuma Kawahara, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 23 days.

(21) Appl. No.: 14/824,552

(22) Filed: Aug. 12, 2015

(65) Prior Publication Data

US 2016/0071542 A1   Mar. 10, 2016

(30) Foreign Application Priority Data

Sep. 9, 2014   (JP) .................................. 2014-182818

(51) Int. Cl.
| | |
|---|---|
| *H04N 5/93* | (2006.01) |
| *G11B 27/11* | (2006.01) |
| *G06F 3/14* | (2006.01) |
| *G09F 27/00* | (2006.01) |

(52) U.S. Cl.
CPC ................ *G11B 27/11* (2013.01); *G06F 3/14* (2013.01); *G09F 27/005* (2013.01); *G09F 2027/001* (2013.01); *G09G 2320/0261* (2013.01); *G09G 2354/00* (2013.01)

(58) Field of Classification Search
CPC ...... G11B 27/005; G11B 27/031; G11B 27/11; G09F 27/005; G09F 2027/001
USPC ................ 386/278, 281, 290, 323, 343, 353
See application file for complete search history.

(56) References Cited

U.S. PATENT DOCUMENTS

| | | | |
|---|---|---|---|
| 2013/0011114 A1* | 1/2013 | Tashiro ................ | G11B 27/105 386/230 |
| 2014/0111668 A1* | 4/2014 | Kon ....................... | H04N 5/772 348/231.99 |
| 2014/0119712 A1* | 5/2014 | Jang ........................ | H04N 9/80 386/248 |

FOREIGN PATENT DOCUMENTS

JP         2011150221 A       8/2011

* cited by examiner

*Primary Examiner* — Robert Chevalier
(74) *Attorney, Agent, or Firm* — Holtz, Holtz & Volek PC

(57) ABSTRACT

An information output device includes an output unit, a recognition unit and a control unit. The output unit outputs a content. The recognition unit recognizes a user. The control unit (i) determines whether the content currently being output by the output unit is suitable for the recognized user, thereby producing a determination result and (ii) changes, on the basis of the determination result, the current output content to a content having the same substance as the current output content but a different playback time from the current output content.

13 Claims, 6 Drawing Sheets

FIG. 2A

| SUMMARY | EXPLANATION OF FUNCTION a | EXPLANATION OF FUNCTION b | EXPLANATION OF FUNCTION c | WORK EXAMPLE (EXAMPLE OF TAKEN PICTURE) | CONCLUSION |
|---|---|---|---|---|---|
| 6 sec. | 6 sec. | 6 sec. | 6 sec. | 6 sec. | 6 sec. |

STANDARD CONTENT
6 sec. per part
36 sec. in total

FIG. 2B

| SUMMARY | EXPLANATION OF FUNCTION a | EXPLANATION OF FUNCTION b | EXPLANATION OF FUNCTION c | WORK EXAMPLE (EXAMPLE OF TAKEN PICTURE) | CONCLUSION |
|---|---|---|---|---|---|
| 4 sec. | 4 sec. | 4 sec. | 4 sec. | 4 sec. | 4 sec. |

SHORTENED CONTENT A
4 sec. per part
24 sec. in total

FIG. 2C

| SUMMARY | EXPLANATION OF FUNCTION a | EXPLANATION OF FUNCTION b | EXPLANATION OF FUNCTION c | WORK EXAMPLE (EXAMPLE OF TAKEN PICTURE) | CONCLUSION |
|---|---|---|---|---|---|
| 2 sec. | 2 sec. | 2 sec. | 2 sec. | 2 sec. | 2 sec. |

SHORTENED CONTENT B
2 sec. per part
12 sec. in total

FIG.3A

| CONTENT ID = 1 | | |
|---|---|---|
| | MALE | FEMALE |
| 0 TO 9 | 1 | 0 |
| 10s | 2 | 0 |
| 20s | 3 | 1 |
| 30s | 3 | 1 |
| 40s | 3 | 1 |
| 50s | 2 | 1 |
| 60s OR MORE | 2 | 0 |

FIG.3B

| CONTENT ID = 2 | | |
|---|---|---|
| | MALE | FEMALE |
| 0 TO 9 | 2 | 2 |
| 10s | 1 | 3 |
| 20s | 1 | 3 |
| 30s | 0 | 2 |
| 40s | 0 | 2 |
| 50s | 0 | 1 |
| 60s OR MORE | 0 | 1 |

# INFORMATION OUTPUT DEVICE AND COMPUTER READABLE MEDIUM

CROSS-REFERENCE TO RELATED APPLICATIONS

This application is based upon and claims the benefit of priority under 35 USC 119 of Japanese Patent Application No. 2014-182818 filed Sep. 9, 2014, the entire disclosure of which, including the description, claims, drawings and abstract, is incorporated herein by reference in its entirety.

BACKGROUND OF THE INVENTION

1. Field of the Invention

The present invention relates to an information output device and a computer readable medium.

2. Description of the Related Art

There has been known a video output device-mounted apparatus having: a video output device connected to a video supply device; a reflecting member; and a screen, wherein the reflecting member reflects output light for projecting a content output from the video output device, and the output light reflected by the reflecting member is projected to the screen formed in the shape of the contour of the content, whereby impressions on viewers can be increased. (Refer to, for example, Japanese Patent Application Publication No. 2011-150221.)

However, the output device described in Japanese Patent Application Publication No. 2011-150221 one-sidedly outputs contents. Hence, even when a content being output is unsuitable for a user who is in front of the device, the device keeps outputting the content.

SUMMARY OF THE INVENTION

Objects of the present invention include dissolving soon an inappropriate situation in which a content unsuitable for a user is being output.

According to an aspect of the present invention, there is provided an information output device including: an output unit which outputs a content; a recognition unit which recognizes a user; and a control unit which (i) determines whether the content currently being output by the output unit is suitable for the recognized user, thereby producing a determination result and (ii) changes, on the basis of the determination result, the current output content to a content having the same substance as the current output content but a different playback time from the current output content.

BRIEF DESCRIPTION OF THE DRAWING

The present invention is fully understood from the detailed description given hereinafter and the accompanying drawings, which are given by way of illustration only and thus are not intended to limit the present invention, wherein:

FIG. 2A schematically shows an example of the structure of a standard content;

FIG. 2B schematically shows an example of the structure of a shortened content A;

FIG. 2C schematically shows an example of the structure of a shortened content B;

FIG. 3A shows an example of a table which defines suitability of a content that explains an outdoor digital camera α for users sex by sex and age by age;

FIG. 3B shows an example of a table which defines suitability of a content that explains a thin pink digital camera β for users sex by sex and age by age;

DETAILED DESCRIPTION OF THE PREFERRED EMBODIMENT

Hereinafter, a preferred embodiment of the present invention is detailed with reference to the drawings. In the following embodiment, an information output device of the present invention is applied to a digital signage device 1 as an example. The present invention is not limited to the illustrated examples.

[Configuration of Digital Signage Device 1]

Figure 1:
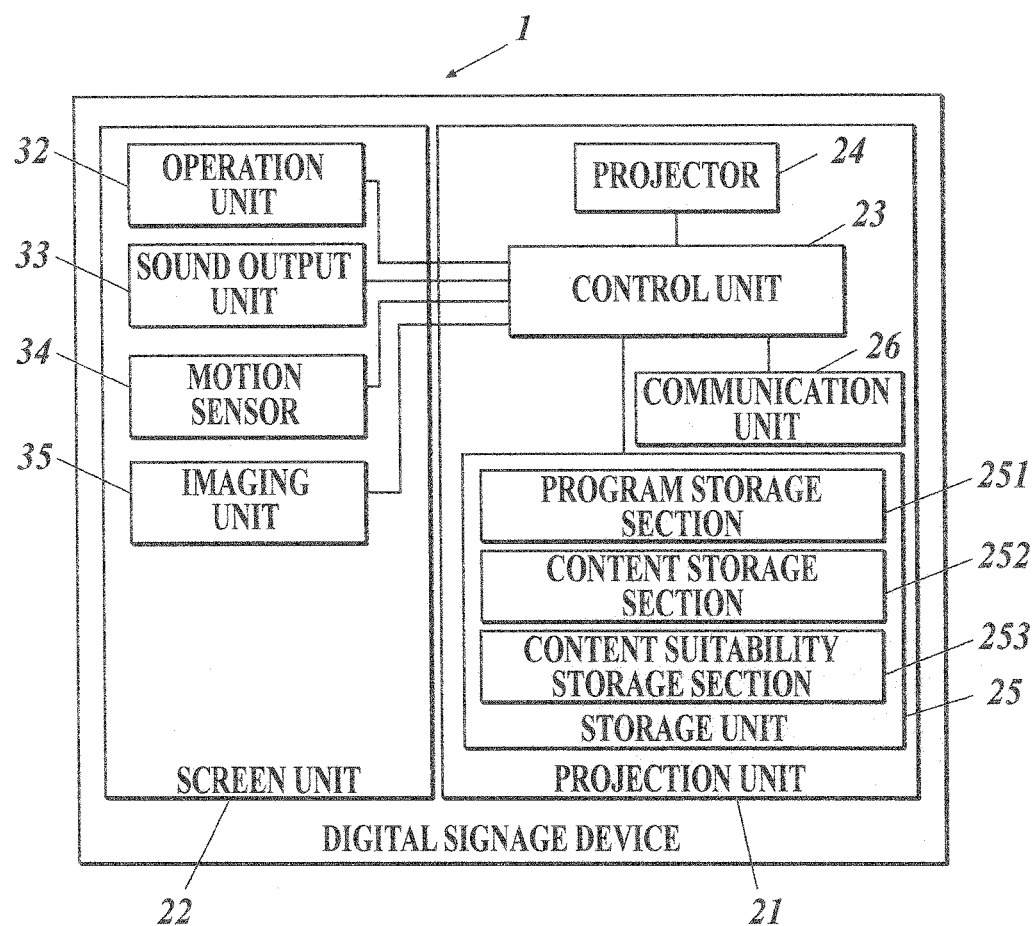
FIG. 1 is a block diagram showing the functional configuration of a digital signage device of an embodiment of the present invention.

FIG. 1 is a block diagram showing main units and the like of the digital signage device 1 to perform control. The digital signage device 1 is a device placed at a store or the like to output contents, such as product explanations, to users (customers).

As shown in FIG. 1, the digital signage device 1 includes a projection unit 21 and a screen unit 22. The projection unit 21 emits video light of contents. The screen unit 22 receives, on the rear, the video light emitted from the projection unit 21 and projects the light to the front.

First, the projection unit 21 is described.

The projection unit 21 includes a control unit 23, a projector 24, a storage unit 25 and a communication unit 26. As shown in FIG. 1, the projector 24, the storage unit 25 and the communication unit 26 are connected to the control unit 23.

The control unit 23 includes a CPU (Central Processing Unit) and a memory (both not shown). The CPU executes various programs stored in a program storage section 251 of the storage unit 25 to perform predetermined arithmetic operations and control the units and the like of the digital signage device 1. The memory serves as a work area when the programs are executed. The control unit 23 performs a content output process described below in cooperation with a program stored in the program storage section 251 of the storage unit 25.

The projector 24 is a projection device which converts image data output from the control unit 23 into video light and emits the video light to the screen unit 22. As the projector 24, for example, a DLP® (Digital Light Processing) projector using a DMD (Digital Micromirror Device) can be used. The DMD is a display element constituted of micromirrors arranged in an array (in the case of XGA, 1024 pixels (width)×768 pixels (height)). The inclination angles of the micromirrors are individually controlled at high speed to individually be an ON state or an OFF state so that display action is performed, and reflected light thereby forms optical images.

The storage unit 25 is constituted of, for example, an HDD (Hard Disk Drive) or a nonvolatile semiconductor memory. As shown in FIG. 1, the storage unit 25 includes the program storage section 251. The program storage section 251 stores therein, for example: programs executed by the control unit 23, including a system program, processing programs to perform various types of processing such as the below-described content output process, and application programs such as a face recognition program and a sex-and-age estimation program; and data necessary to execute these programs.

The storage unit 25 also includes a content storage section 252 and a content suitability storage section 253.

The content storage section 252 stores therein content data to output contents to an image formation unit 27 or the like, the content data being correlated with their respective content IDs (1 to 4 in the embodiment) to identify the contents. Each content data is constituted of: video data constituted of frame images; and sound data associated with the respective frame images.

In the embodiment, for each content (output-target content), a standard content and shortened contents A and B corresponding to the standard content are stored. These three types of content data are different in playback time. The standard content is content data having a non-shortened playback time with a purpose of being viewed by users. The shortened content A is content data made by shortening the playback time of the standard content. The shortened content B is content data made by shortening the playback time of the standard content such that the playback time of the content data (shortened content B) becomes shorter than that of the shortened content A. The standard content, the shortened content A and the shortened content B are the same in substance.

FIG. 2A to FIG. 2C schematically show examples of the structures of the standard content, the shortened content A and the shortened content B of a content that explains a digital camera as a product. In the embodiment, the content that explains a digital camera as a product is described, but the substance of a content is not limited thereto.

For example, as shown in FIG. 2A, the standard content is a content constituted of six parts of "Summary", "Explanation of Function a", "Explanation of Function b", "Explanation of Function c", "Work Example (Example of Taken Picture)" and "Conclusion". The playback time for each part is six seconds, so that the total playback time is 36 seconds. In this case, the shortened content A is, as shown in FIG. 2B, for example, a content having a playback time shorter than the standard content by two seconds for each part, thereby having a total playback time of 24 seconds with a playback time of four seconds for each part. Then, the shortened content B is, as shown in FIG. 2C, for example, a content having a playback time shorter than the standard content by four seconds for each part, thereby having a total playback time of 12 seconds with a playback time of two seconds for each part. The playback time of each part of each shortened content (A or B) may be made shorter than that of each part of the standard content, for example, by summarizing each part of the standard content or by explaining the identical substance (i.e., exactly the same substance) by speaking fast.

The content suitability storage section 253 stores therein, for each content, a table which defines suitability indicating how suitable the content is for users with numerical values sex by sex and age by age (decade by decade). For example, in the case where the substance of a content is a product explanation as with the embodiment, for a customer stratum at which the product being explained is more targeted (a customer stratum which is more expected to buy the product being explained), the defined suitability is higher.

FIG. 3A shows an example of a table which defines suitability of a content (content ID=1) that explains an outdoor digital camera α for users sex by sex and age by age. FIG. 3B shows an example of a table which defines suitability of a content (content ID=2) that explains a thin pink digital camera β for users sex by sex and age by age. In the tables shown in FIG. 3A and FIG. 3B, the suitability is represented by four ranks, from 0 to 3. The "3" means that the suitability is the highest (the most suitable). The "0" means that the suitability is the lowest (not suitable at all). The smaller the numerical value is, the lower the suitability is.

The communication unit 26 is constituted of a modem, a router, a network card and the like and communicates with an external device connected to a communication network such as LAN.

Next, the screen unit 22 is described.

Figure 4:
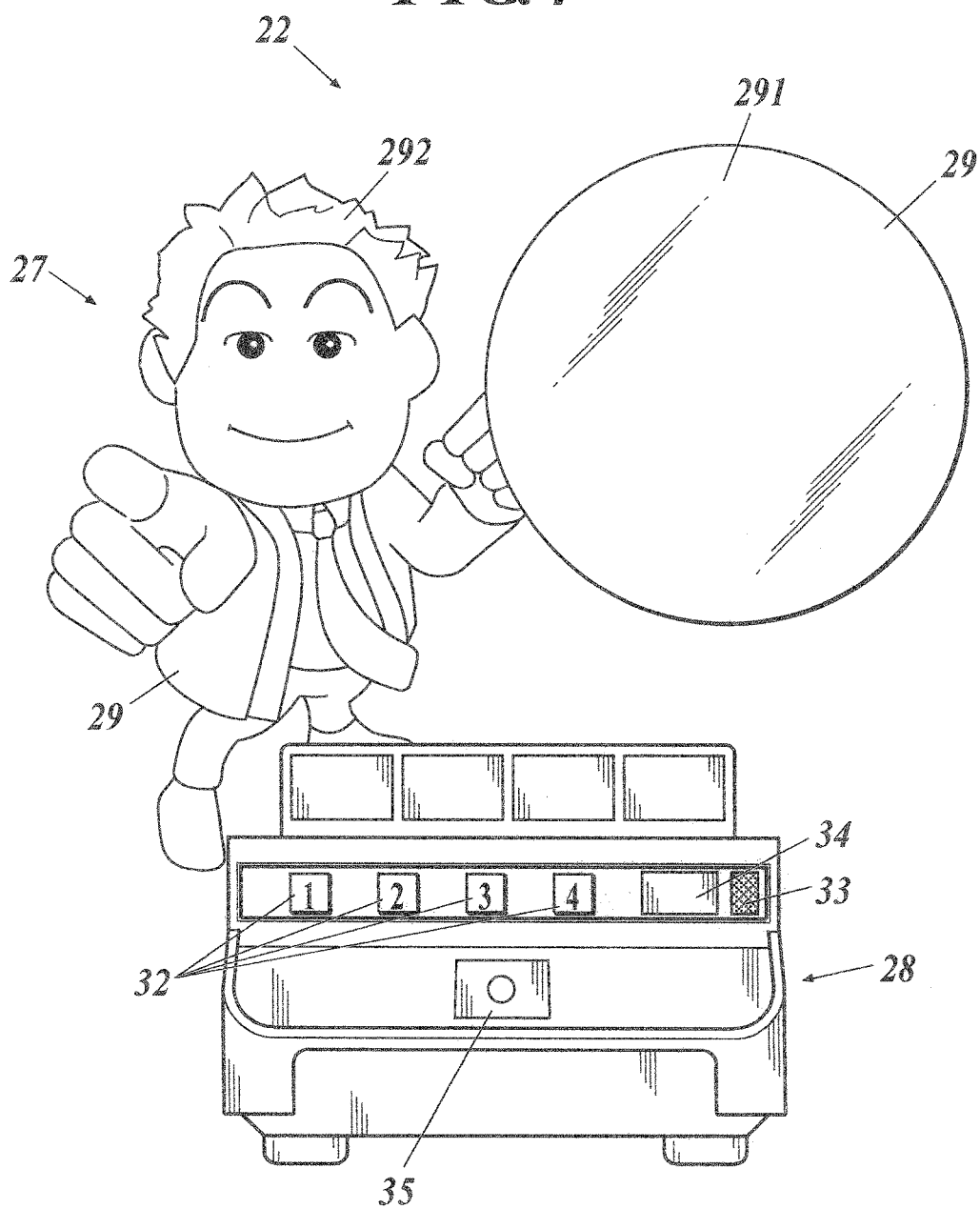
FIG. 4 roughly shows the configuration of a screen unit shown in FIG. 1.

FIG. 4 is a front view roughly showing the configuration of the screen unit 22. As shown in FIG. 4, the screen unit 22 includes the image formation unit 27 and a pedestal 28 which holds the image formation unit 27.

The image formation unit 27 is a screen configured such that a film-shaped Fresnel lens-overlaid film screen 291 for rear projection and a pre-printed film 292 are attached to a translucent plate 29. The translucent plate 29 is disposed approximately at right angles to a direction in which video light is emitted and, for example, is an acrylic plate formed in the shape of a person. The projector 24 projects images to a region where the film screen 291 is attached in the image formation unit 27. The image formation unit 27 and the projector 24 constitute an output unit.

The pedestal 28 is provided with: a button-type operation unit 32; a sound output unit 33 which outputs sounds, such as a speaker; a motion sensor 34; and an imaging unit 35.

The operation unit 32 includes a variety of operation buttons, and detects press signals of the operation buttons and outputs the signals to the control unit 23.

The motion sensor 34 detects existence of persons in a predetermined area around the digital signage device 1 with infrared rays, ultrasound or the like and outputs detection signals to the control unit 23. The motion sensor 34 functions as a recognition unit.

The imaging unit 35 is an imaging unit which takes images of a space facing the digital signage device 1, thereby producing taken images. The imaging unit 35 includes: a camera including an optical system and an imaging element; and an imaging control unit which controls the camera (all not shown).

The optical system of the camera is directed toward users who are in front of the digital signage device 1 to photograph the users. The imaging element thereof is an image sensor such as a CCD (Charge Coupled Device) or a CMOS (Complementary Metal-oxide Semiconductor). The imaging element converts optical images having passed through the optical system into two-dimensional image signals.

The operation unit 32, the sound output unit 33, the motion sensor 34 and the imaging unit 35 are, as shown in FIG. 1, connected to the control unit 23.

[Action of Digital Signage Device 1]

Next, action of the digital signage device 1 is described.

Figure 5:
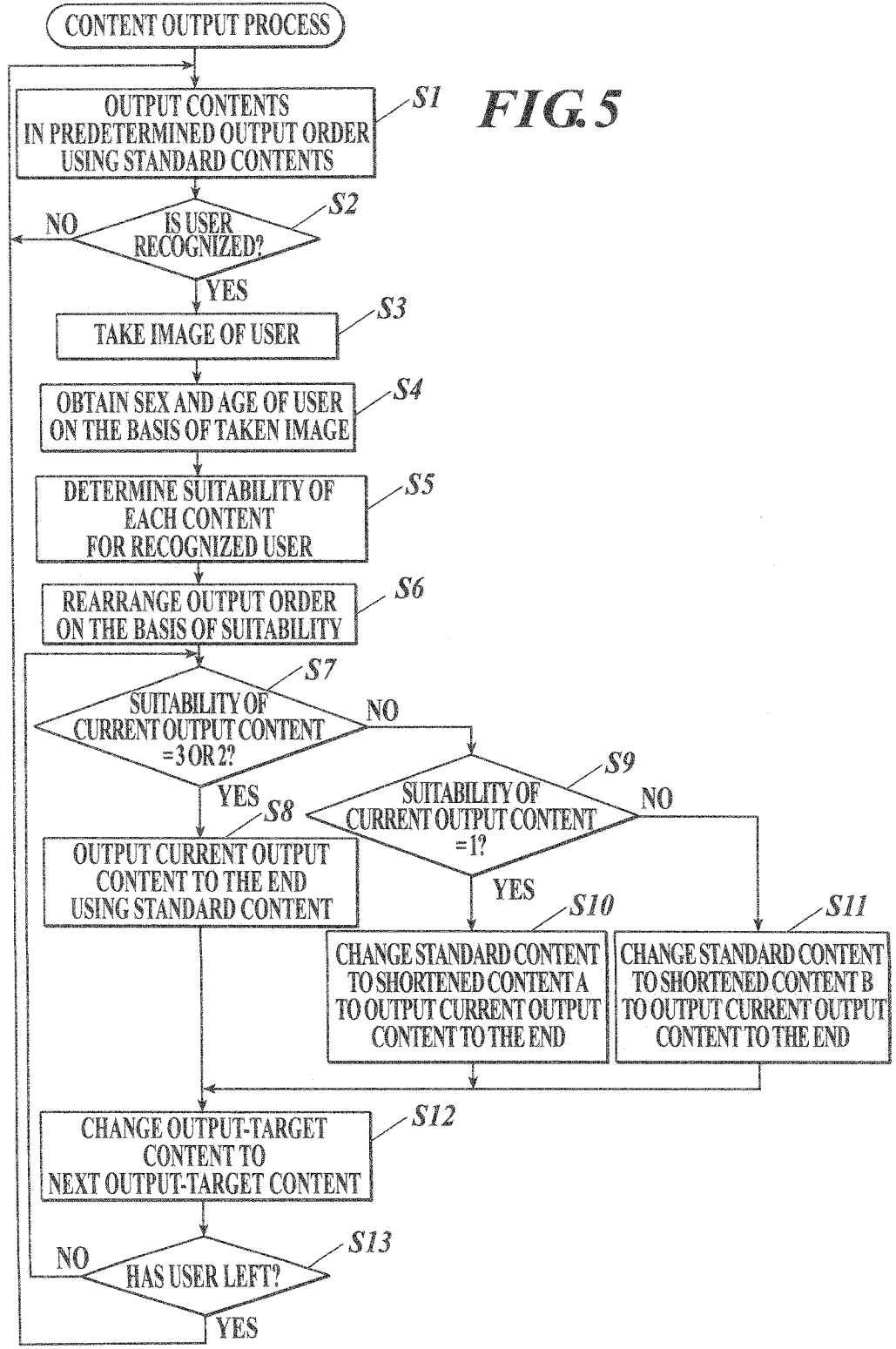
FIG. 5 is a flowchart of a content output process performed by a control unit shown in FIG. 1.

FIG. 5 is a flowchart of the content output process performed in the digital signage device 1. The content output process is performed by the control unit 23 and the program stored in the program storage section 251 in cooperation with each other when the digital signage device 1 is powered.

First, the control unit 23 allows the image formation unit 27 and the sound output unit 33 to output contents in a predetermined output order using standard contents (Step S1). More specifically, the control unit 23 reads standard contents equivalent to output-target contents from the content storage section 252 and successively outputs frame images thereof to the projector 24 so that the projector 24 projects the images to the image formation unit 27. In addition, the control unit 23 outputs sound data of the read standard contents to the sound output unit 33 so that the sound output unit 33 outputs sounds of the contents.

At Step S1, the contents are output in order of content IDs, and after the last content is output, the first content is output again. In the embodiment, the contents are output in order of content IDs 1→2→3→4→1 . . . .

When a predetermined time (one second, for example) elapses, the control unit 23 determines on the basis of a detection signal from the motion sensor 34 whether a user is recognized (Step S2). For example, the control unit 23 determines that a user is recognized when the detection signal from the motion sensor 34 is ON.

When determining that no user is recognized (Step S2; NO), the control unit 23 returns to Step S1. The control unit 23 repeats Step S1 and Step S2 until a user is recognized.

When determining that a user is recognized (Step S2; YES), the control unit 23 performs Step S3 to Step S13. During Step S3 to Step S7 and Step S9, the image formation unit 27 and the sound output unit 33 keep outputting the contents.

At Step S3, the control unit 23 allows the imaging unit 35 to perform imaging so as to obtain a taken image of the recognized user (Step S3).

Next, the control unit 23 reads the face recognition program and the sex-and-age estimation program from the program storage section 251, performs face recognition on the taken image produced through the imaging and obtains sex and age of the user on the basis of a face image recognized through the face recognition (Step S4). The face recognition and obtainment of sex and age of a user based on a face image can be performed using well-known image processing technologies.

Next, the control unit 23 determines suitability of each of the contents (including the content currently being output (i.e., current output content)) for the recognized user on the basis of the sex and age of the user obtained at Step S4 (Step S5) and rearranges the output order of the contents on the basis of the determined suitability of each of the contents (Step S6). More specifically, the control unit 23 refers to the content suitability storage section 253 to determine suitability of each of the contents for the sex and age obtained at Step S4 and then rearranges the contents except the current output content in descending order of the determined suitability as the output order of the contents to output after the current output content, regarding the current output content as the first content to output. For example, when the current output content has a content ID of 1, and the descending order of the suitability of the contents having content IDs of 2, 3 and 4 is 2→4→3, the output order of the contents is rearranged to be 1→2→4→3→1 . . . . After the last content, the first content is output again.

Next, the control unit 23 determines whether or not the suitability of the current output content for the recognized user is 3 or 2 (Step S7). When determining that the suitability of the current output content for the recognized user is 3 or 2 (Step S7; YES), the control unit 23 allows the image formation unit 27 and the sound output unit 33 to keep outputting the current output content to the end using the standard content (Step S8). When output of the content finishes, the control unit 23 moves to Step S12.

When the suitability of the current output content for the recognized user is 2 or 3, the control unit 23 determines that the current output content is suitable for the user and allows the current output content to continue to be output using the standard content without changing.

On the other hand, when determining that the suitability of the current output content for the recognized user is neither 2 nor 3 (Step S7; NO), the control unit 23 determines whether the suitability of the current output content for the recognized user is 1 (Step S9). When determining that the suitability of the current output content for the recognized user is 1 (Step S9; YES), the control unit 23 reads the shortened content A of the current output content from the content storage section 252 and changes the standard content to the shortened content A to allow the image formation unit 27 and the sound output unit 33 to output the current output content to the end using the shortened content A (Step S10). When output of the content finishes, the control unit 23 moves to Step S12.

When the suitability of the current output content for the recognized user is 1, the control unit 23 determines that the current output content is unsuitable for the user and allows the current output content to be output using the shortened content A. It is unnatural to stop the current output content halfway, whereas perhaps the user will leave (depart) if the content (standard content) continues to be output to the end. Then, the standard content is changed to the shortened content A, so that the content unsuitable for the user can be brought to an end soon. For example, as shown in FIG. 2A and FIG. 2B, the standard content takes 36 seconds whereas the shortened content A takes 24 seconds. That is, use of the shortened content A allows the output-target content to finish by taking ⅔ of the standard content. Consequently, the inappropriate situation in which a content unsuitable for a user is being output can be dissolved soon without the user having a strange feeling, which can prevent the user from leaving.

On the other hand, when determining that the suitability of the current output content for the recognized user is not 1 (i.e., 0) (Step S9; NO), the control unit 23 reads the shortened content B of the current output content from the content storage section 252 and changes the standard content to the shortened content B to allow the image formation unit 27 and the sound output unit 33 to output the current output content to the end using the shortened content B (Step S11). When output of the content finishes, the control unit 23 moves to Step S12.

When the suitability of the current output content for the recognized user is 0, the control unit 23 determines that the current output content is not suitable for the user at all and allows the current output content to be output using the shortened content B, which is shorter than the shortened content A. It is unnatural to stop the current output content halfway, whereas the user will probably leave (depart) if the content (standard content) continues to be output to the end. Then, the standard content is changed to the shortened content B, so that the content unsuitable for the user can be brought to an end immediately. For example, as shown in FIG. 2A and FIG. 2C, the standard content takes 36 seconds whereas the shortened content B takes 12 seconds. That is, use of the shortened content B allows the output-target content to finish by taking ⅓ of the standard content. Consequently, the inappropriate situation in which a content unsuitable for a user is being output can be dissolved immediately without the user having a strange feeling, which can prevent the user from leaving.

At Step S12, the control unit 23 changes the output-target content to the next output-target content (Step S12).

Next, the control unit 23 determines whether the user has left (Step S13). More specifically, when the detection signal of the motion sensor 34 changes from ON to OFF, the control unit 23 determines that the user has left.

When determining that the user has not left yet (Step S13; NO), the control unit 23 returns to Step S7 and repeats Step S7 to Step S13. More specifically, the control unit 23 determines the suitability of the next content, which now becomes the current output content, for the recognized user and allows the content to be output with or without changing the standard content to the shortened content A or B depending on the determined stability.

At Step S6, the output order of the contents is rearranged to be the descending order of the suitability for the recognized user. Hence, when the content being output at the time of recognition of the user finishes, the other contents are output in descending order of the stability for the user, namely, from the most suitable content, which can attract the user for a long period of time.

Figure 6:
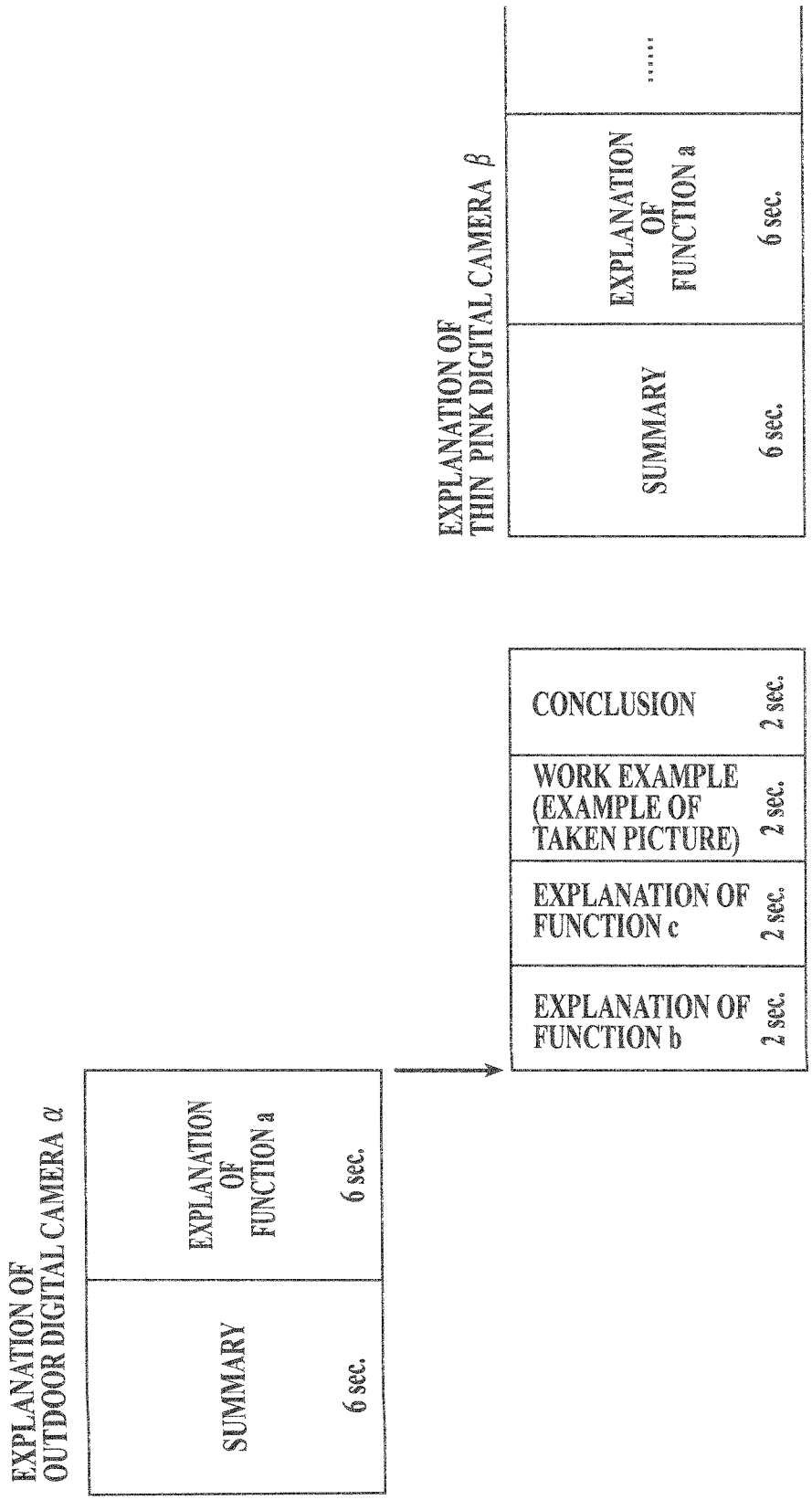
FIG. 6 schematically shows an example of content output control.

FIG. 6 schematically shows content output control in the case where a female user in her 20s is recognized while the content that explains the outdoor digital camera α, the content having the structure shown in FIG. 2A, is being output.

For example, when a female user in her 20s is recognized while the "Explanation of Function a" of the content that explains the outdoor digital camera α is being output (using the standard content) as shown in FIG. 6, the suitability of the current output content for the user is determined as "1" through Step S3 to Step S9 of the content output process. Then, the standard content is changed to the shortened content A so that the part "Explanation of Function b" and the following parts are output using the shortened content A. Consequently, the current output content unsuitable for the recognized user can be brought to an end sooner than usual. When the current output content finishes, the content that explains the thin pink digital camera β, which is suitable for this recognized user, is output using the standard content.

On the other hand, when determining that the user has left (Step S13; YES), the control unit 23 returns to Step S1.

The control unit 23 repeats Step S1 to Step S13 until the digital signage device 1 is powered off.

As described above, according to the digital signage device 1, when the motion sensor 34 recognizes a user, the control unit 23 determines the suitability of the content currently being output by the image formation unit 27 and the sound output unit 33 for the recognized user and changes the current output content (standard content) to a shortened content on the basis of the determined suitability.

Hence, when a content unsuitable for a user is being output, this inappropriate situation is dissolved soon without the user having a strange feeling, which can prevent the user from leaving.

The suitability can be determined, for example, as follows: perform face recognition on an image of the recognized user taken by the imaging unit 35; obtain sex and age of the user on the basis of a face image recognized through the face recognition; and determine the suitability on the basis of the obtained sex and age.

Further, for example, the current output content (standard content) is changed to a shortened content having a playback time fit for the determined suitability. Consequently, the content can be output using a content having a playback time fit for the suitability for the recognized user.

Further, when a plurality of contents are output in a predetermined output order, the suitability of each of the contents for the recognized user is determined, and on the basis of determination results about the respective contents, the output order of the contents to output after a content currently being output is rearranged. Consequently, after the current output content, the other contents can be output in descending order of the stability for the recognized user, namely, from the most suitable content.

The description of the above embodiment is one preferred example of the digital signage device of the present invention, and hence the present invention is not limited thereto.

For example, in the above embodiment, contents are constituted of moving images (videos) (with sounds) but not limited thereto and hence may be constituted of only images or only sounds.

Further, in the above embodiment, the suitability of each content for users has four ranks, but the number of ranks of the suitability is not limited thereto. Further, the number of shortened contents together with the standard content may be equivalent to the number of ranks of the suitability. Further, the suitability may have two ranks of "suitable" and "unsuitable", and when the current output content is determined as unsuitable for a recognized user, the content (standard content) may be changed to its shortened content.

Further, in the above embodiment, each shortened content is made by shortening the playback times of the parts of the standard content but not limited thereto. For example, a shortened content may be made by omitting at least one of the parts of the standard content or by combining and abridging some of the parts of the standard content, thereby shortening the total playback time.

Further, in the above embodiment, the suitability of a content for users is defined sex by sex and age by age in advance by a table. Alternatively, the suitability may be calculated using a mathematical formula.

Further, in the above embodiment, a user is recognized on the basis of the detection signal of the motion sensor 34, which functions as the recognition unit. However, the recognition unit is not limited thereto. For example, a user may be recognized as follows: perform face recognition on an image taken by the imaging unit 35; and recognize a user when a face is recognized in the taken image. Similarity, user's departure may be determined as follows: perform face recognition on an image taken by the imaging unit 35; and determine that a user has left when no face is recognized in the taken image. Alternatively, the face image of the recognized user may be stored in a memory, and when a face image which matches the face image stored in the memory cannot be recognized in a taken image, it may be determined that the user has left.

Further, in the above embodiment, the present invention is applied to the digital signage device which displays images by projecting the images from the projector to the screen but not limited thereto. The present invention can demonstrate the same effects described above when applied to an information output device provided with another type of display device such as a liquid crystal display or a plasma display.

Further, in the above embodiment, when a content is unsuitable for a user, the content (standard content) is changed to a shortened content. However, this is no limitation. For example, when a content is suitable for a user, the content may be changed to a content having a longer playback time.

The detailed configuration and action of the digital signage device can also be appropriately modified without departing from the spirit of the present invention.

In the above, an embodiment of the present invention is described. However, the scope of the present invention is not limited to the above embodiment but includes the scope of claims below and the scope of their equivalences.

What is claimed is:

1. An information output device comprising:
   an output unit which outputs a content;
   a recognition unit which recognizes a user; and
   a control unit which (i) determines whether the content currently being output by the output unit is suitable for the recognized user, thereby producing a determination result and (ii) changes, on the basis of the determination result, the current output content to a content having the same substance as the current output content but a different playback time from the current output content.

2. The information output device according to claim 1, wherein the content having the same substance as the current output content but the different playback time from the current output content is a shortened content having a shorter playback time than the current output content.

3. The information output device according to claim 2, wherein the control unit changes the current output content to the shortened content when the control unit determines that the current output content is unsuitable for the recognized user.

4. The information output device according to claim 2, wherein the control unit (i) determines suitability of the current output content for the recognized user and (ii) changes the current output content to the shortened content on the basis of the determined suitability.

5. The information output device according to claim 4, wherein the control unit changes the current output content to the shortened content having the playback time fit for the determined suitability.

6. The information output device according to claim 1 further comprising an imaging unit which takes an image of the recognized user,
   wherein the control unit (i) performs face recognition on the taken image, (ii) obtains sex and age of the recognized user on the basis of a face image recognized through the face recognition and (iii) determines whether the current output content is suitable for the recognized user on the basis of the sex and the age.

7. The information output device according to claim 1, wherein:
   the output unit outputs a plurality of contents including the current output content in a predetermined output order, and
   the control unit (i) determines whether the contents are each suitable for the recognized user, thereby producing respective determination results and (ii) rearranges, on the basis of the determination results, the output order of the contents to be output after the current output content.

8. The information output device according to claim 2, wherein:
   the output unit outputs a plurality of contents including the current output content in a predetermined output order, and
   the control unit (i) determines whether the contents are each suitable for the recognized user, thereby producing respective determination results and (ii) rearranges, on the basis of the determination results, the output order of the contents to be output after the current output content.

9. The information output device according to claim 3, wherein:
   the output unit outputs a plurality of contents including the current output content in a predetermined output order, and
   the control unit (i) determines whether the contents are each suitable for the recognized user, thereby producing respective determination results and (ii) rearranges, on the basis of the determination results, the output order of the contents to be output after the current output content.

10. The information output device according to claim 4, wherein:
    the output unit outputs a plurality of contents including the current output content in a predetermined output order, and
    the control unit (i) determines whether the contents are each suitable for the recognized user, thereby producing respective determination results and (ii) rearranges, on the basis of the determination results, the output order of the contents to be output after the current output content.

11. The information output device according to claim 5, wherein:
    the output unit outputs a plurality of contents including the current output content in a predetermined output order, and
    the control unit (i) determines whether the contents are each suitable for the recognized user, thereby producing respective determination results and (ii) rearranges, on the basis of the determination results, the output order of the contents to be output after the current output content.

12. The information output device according to claim 6, wherein:
    the output unit outputs a plurality of contents including the current output content in a predetermined output order, and
    the control unit (i) determines whether the contents are each suitable for the recognized user, thereby producing respective determination results and (ii) rearranges, on the basis of the determination results, the output order of the contents to be output after the current output content.

13. A non-transitory computer readable medium readable by a computer including an output unit which outputs a content, the computer readable medium storing therein a program which is executable by the computer to perform processes comprising:
    a recognition process of recognizing a user;
    a determination process of determining whether the content currently being output by the output unit is suitable for the recognized user, thereby producing a determination result; and
    an output control process of changing, on the basis of the determination result, the current output content to a content having the same substance as the current output content but a different playback time from the current output content.

* * * * *